Sept. 16, 1941. W. A. RIDDELL 2,256,354
PHOTOFLASH SYNCHRONIZING DEVICE
Filed Jan. 23, 1940
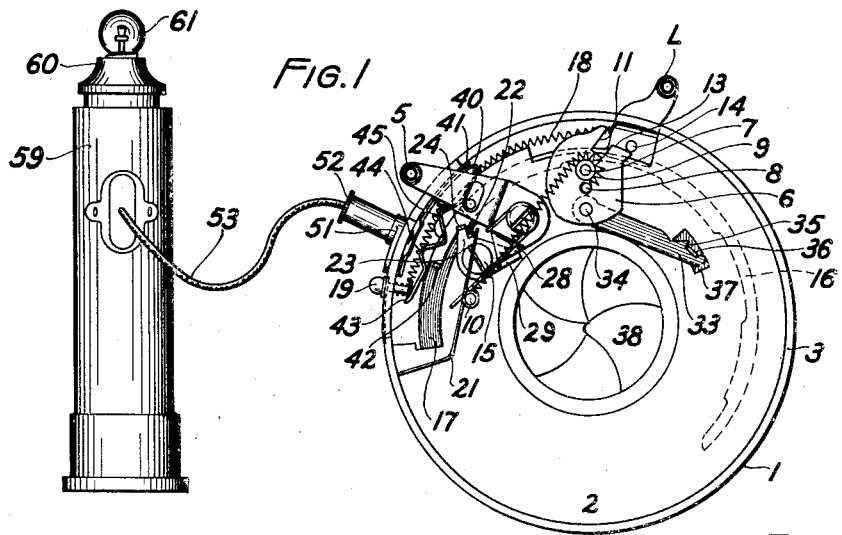
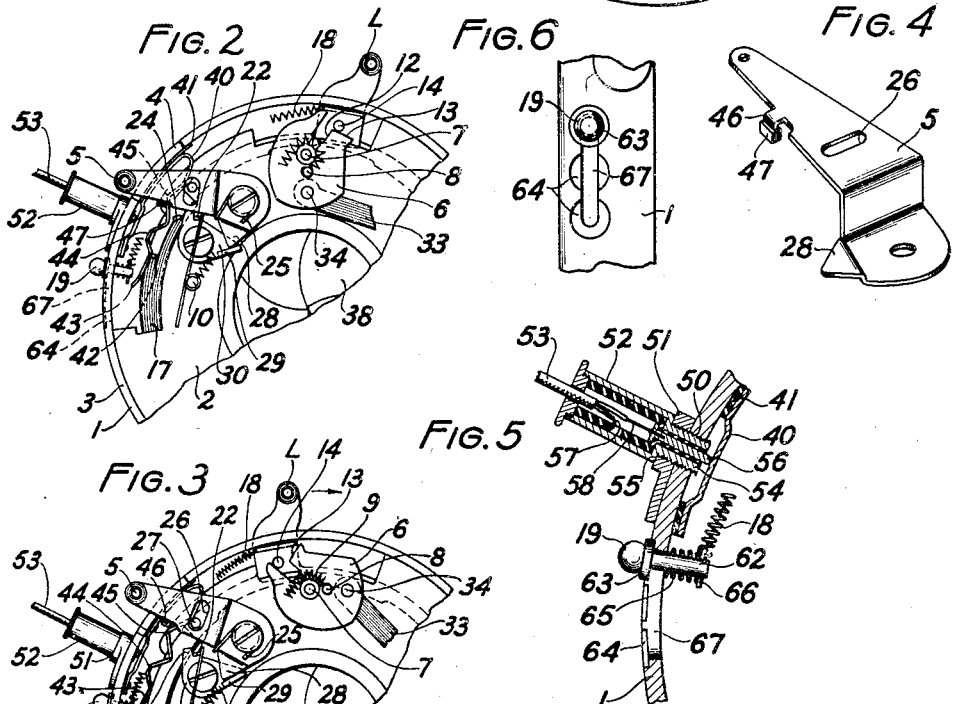
WILLIAM A. RIDDELL
INVENTOR Patented Sept. 16, 1941

2,256,354

UNITED STATES PATENT OFFICE 2,256,354

PHOTOFLASH SYNCHRONIZING DEVICE

William A. Riddell, Rochester, N. Y., assignor to Eastman Kodak Company, Rochester, N. Y., a corporation of New Jersey Application January 23, 1940, Serial No. 315,221

11 Claims. (Cl. 67—29)

The present invention relates to photography, and particularly to a photoflash synchronizing device suitable for synchronizing the flashing of a lamp and the opening of a camera shutter when instantaneous exposures at high shutter speeds are desired.

It is well known to those skilled in the art that after the circuit including a flash lamp is closed, there is a certain period during the warming up of the lamp filament when no light appears, and after which the brilliance of the lamp increases more or less gradually, depending upon the particular lamp being used, to its peak of illumination. The lamp will have a given duration of maximum brilliance, dependent upon its characteristics, after which its brilliancy will drop more or less gradually to zero. That period between the time that the lamp circuit is closed and when the lamp starts to show light is generally known as the "lag" of the lamp and this lag may vary between .008 to .012 of a second depending upon the characteristics of the lamp under consideration. Most known flash lamps will reach their peak of illumination in about .020 of a second after the circuit to the filament is closed, which means that from .012 to .008 of a second is required to reach the peak of illumination after the lamp starts to glow. Since it is desirable in making flashlight pictures with instantaneous exposures to utilize only that portion of the lamp illumination adjacent and including the peak of illumination, the "lag" in the lamp so far as necessary compensation by a synchronizer is concerned may be in the neighborhood of from .015 to .018 of a second.

With synchronizing devices operating with the shutter set at time or bulb exposures, the speed of the actual exposure is determined by the duration of the flash of the lamp so that with such devices the "lag" characteristic of lamps, as pointed out above, are not involved. However, when the flashing of the lamp is to be synchronized with a shutter giving an instantaneous exposure the synchronizer must insure the shutter being open during the peak of illumination of the lamp. With slow shutter speeds, such as 1/25 or 1/50 of a second, wherein the shutter is opened for .040 and .020 of a second respectively, there can be a substantial variation in synchronization without appreciably affecting the exposure. However, where fast exposures of the nature of 1/400 or 1/500 of a second are desired, and wherein the shutter is open only .002 of a second, synchronization must be very exact in order to have the shutter open right at the peak of illumination of the lamp. Synchronization at such high shutter speeds is further rendered exacting due to the fact that with such fast exposures the maximum light possible is required and the lamp generally adapted therefore has a relatively sharp peak of illumination.

Synchronizing devices which are separate from the shutter operating mechanism and operate through a mechanical arrangement remote therefrom to set off the shutter in timed relation to the closing of the lamp circuit include lost motion which is almost impossible to account for in adjusting for synchronization so that such arrangements are not particularly adapted for synchronization at the higher shutter speeds. In addition, any shutter has a "lag" characteristic of its own, as the time required to open after release is often referred to, which must be taken into account in determining synchronization at the higher speeds; synchronizing devices separate from the shutter operating mechanism itself are not adapted to be adjusted to account for this shutter lag in conjunction with the lamp "lag," particularly where high shutter speeds are concerned.

Therefore, one object of the present invention is to provide a flash synchronizing device which overcomes all of the shortcomings of known synchronizers, as noted above, and which is adapted for proper synchronization at high shutter speeds, e. g. 1/400 to 1/500 of a second.

Another object is to provide a synchronizing device which is built into the shutter actuating mechanism to essentially become a part thereof to give a neat compact arrangement wherein the lamp circuit is controlled in proper timed relation with the shutter operation through the movement of the mechanism of the shutter itself.

And another object is to provide a synchronizing device of the type described wherein the lamp circuit is adapted to be completed at the proper time prior to the release of the shutter to insure proper synchronizing at low or high shutter speeds.

And a further object is to provide a device of the type described wherein a lost-motion connection between the setting lever and the driving means of the shutter, which driving means is adapted to be held in a tensioned condition by said lever, is utilized to effect a closing of the lamp circuit prior to the release of the shutter to account for the "lag" in the lamp and the lag in the shutter.

And yet another object is to provide a synchronizing device of the type described wherein one of the switch contacts is normally moved out of the path of movement of the other whereby the lamp circuit cannot be completed during the setting of the shutter.

A further object is to arrange said switch contact which is normally removed from the path of the other contact so that it is adapted to be moved into said path by movement of the shutter trigger to its operative position.

And another object is to provide a synchronizing device of the type described in which one contact is carried by the setting member to move therewith, said setting member being adapted to effect a setting and releasing of the shutter, but having a lost motion connection with said shutter mechanism whereby it can move idly over a given path relative to said mechanism after setting the same and prior to the release thereof; said setting member being driven by a spring of its own whereby its speed of movement is independent of the shutter mechanism or the release trigger.

And still another object is to provide means for varying the speed of movement of said setting member upon release, whereby the synchronizing device can be adapted for synchronization at different shutter speeds.

The novel features that I consider characteristic of my invention are set forth with particularity in the appended claims. The invention itself, however, both as to its organization and its methods of operation, together with additional objects and advantages thereof, will best be understood from the following description of specific embodiments when read in connection with the accompanying drawing in which—

Fig. 1 is a top plan view of a photographic shutter and combined synchronizing device constructed in accordance with, and embodying a preferred form of the invention. In this figure the shutter is shown with the cover removed and the parts thereof in a set position.

Fig. 2 is a view corresponding to Fig. 1, but showing the setting member of the shutter after release, and just prior to releasing the shutter operating mechanism.

Fig. 3 is a view corresponding to Figs. 1 and 2, but showing the parts of the shutter after the shutter has made an exposure, and prior to their being set, Fig. 4 is a perspective showing the shutter trigger in detail, Fig. 5 is a sectional detail showing the manner of conveniently connecting the switch contacts in the shutter to opposite sides of an electric circuit including a flash lamp, along with means for adjusting the speed of movement as the setting member in accordance with different shutter speeds, and Fig. 6 is a partial elevation of the side of the shutter casing, and showing the means for adjusting the tension, or driving, spring of the setting member in accordance with different shutter speeds.

Like reference characters refer to corresponding parts throughout the drawing.

It is well known in the art that the easiest and most satisfactory manner of securing accurate shutter and flash synchronization is to incorporate the switch contacts of a lamp circuit in the shutter operating mechanism so that the movement of the shutter mechanism itself will effect the closure of the lamp circuit in proper timed relation with the opening of the camera shutter. The present synchronizing device makes use of such arrangement inasmuch as one switch contact is mounted in the path of movement of, and so as to be engaged by, a second contact carried by the shutter mechanism. The closure of the lamp circuit prior to the release of the shutter to account for the "lag" in the lamp is accounted for by providing a lost-motion connection between the setting member and the shutter master member during which time the lamp circuit is closed prior to the setting member reaching the point where it releases the master member. So that movement of the setting member, and consequently the time of closure of the lamp circuit, will be independent of any part of the shutter mechanism, or the speed of operation thereof; the setting member is adapted to be normally moved from its set position by its own driving spring and to be released by a latch mechanism operated by the shutter trigger. To adjust the speed of movement of the setting member upon release, whereby the time of the lamp circuit closing prior to release of the shutter for synchronization at different high shutter speeds can be effected, means are provided for varying the tension of the driving spring of the setting member.

While I have chosen to disclose my invention as applied to one particular form of shutter of the setting type it is pointed out that it could, without going beyond the scope of the present invention, be readily applied to any setting type shutter, e. g. focal plane, by merely providing for one of the two contacts being mounted on a part of the shutter mechanism which is adapted to move relative to the remainder of the mechanism prior to the release of the shutter to engage a stationary contact during such relative movement and prior to the release of the shutter. While it is not necessarily a limitation, it is desirable that the member carrying the movable contact have a driving means independent of manual control, or independent of the movement of any other part of the shutter operating mechanism.

Referring now to Fig. 1 of the drawing, the present invention constitutes a shutter of the setting type which may comprise a casing 1 in which a plate 2 is mounted and about which there is an upstanding flange 3. The flange 3 is provided with a cut-out notch 4, through which a trigger 5 may operate, and with another notch, not shown, thru which the setting member L may extend.

The master member 6 may be pivoted at 7 and may be attached at 8 to a power spring 9, the opposite end 10 of which is anchored on the plate 2. The master member is provided with a short slot between the walls 11 and 12, the latter wall terminating in a shoulder 13. When the shutter is in its unset position the master member 6 lies in the position shown in Fig. 3 with the setting pin 14 carried by the setting member L in a position to engage the wall 11 so that when the setting lever is moved in the direction shown by the arrow in Fig. 3 the pin 14 will engage the wall 12 to turn the master member to the position shown in Fig. 1 and tension the spring 9. Thus the parts may be moved to the set position shown in Fig. 1, and in this position it will be noticed that the pin 14 lies on the top of shoulder 13. Since the pin 14 moves in an arc, due to the arcuate member 16 connected thereto moving in the slot 17 which is concentric to the shutter casing 1, the master member is held against movement in a counter-clockwise direction by said pin 14. Any sudden jar applied to the shutter will not release this connection because of the spring 9 constantly holding the shoulder 13 against the pin 14. The mounting of the lever L and its cooperation with the master member 6 to give the desired lost-motion connection between the two during the setting and release of the shutter is completly set forth in U. S. Patent 2,176,844, issued to me October 17, 1939, and to which patent reference can be had for a more complete description of the shutter mechanism per se.

Referring to Fig. 2 it will be noticed that the pin 14 leaves the slot in the master member 6 prior to the time the shutter member reaches its set position, see Fig. 1. At the time said pin leaves the slot in the master member, said master member has been set, and although the setting member L and the pin 14 thereon can move further in a clockwise direction relative to the master member, the engagement of the pin 14 with the shoulder 13 holds said master member against movement under the action of the power spring 9. This lost-motion connection between the setting member and the master member forms one of the important features of the synchronizing device constituting the present invention as will be fully described hereinafter.

The setting member L is normally moved counter-clockwise, or to its position of rest, by an individual driving spring 18 connected at one end to the member and at the other end to a pin 19 adapted to be moved over the periphery of the shutter casing 1 as, and for the purpose, hereinafter fully set forth. The setting member is adapted to be releasably held in its set position, see Fig. 1, by a latch mechanism comprising a bellcrank 20 pivoted at 15 to the plate 2 and normally moved in a counter-clockwise direction by a spring 21 engaging a turned down lug 22 thereon so that the end of the arm 23 will engage a catch member 24 on the arcuate member 16 of the setting member when said setting lever is moved to its set position.

The latch mechanism is adapted to be released by momentarily pressing the trigger 5 downward against the action of the spring 25 normally tending to move it upwardly. The movement of the trigger may be limited in both directions by the engagement of a slot 26 therein and a stop pin 27 extending upward to the plate 2. The trigger 5 includes a nose portion 28 which is adapted to engage an upturned ear 29 on the arm 30 of the bellcrank 20 when the trigger is pressed and to pivot said bellcrank clockwise so that it will release the catch member 24 and consequently the setting member. Upon release, the setting member is permitted to move counter-clockwise under the influence of the driving spring 18, and when it has moved a sufficient distance so that the pin 14 thereon comes off the shoulder 13, the master member 6 is released and quickly rotates counter-clockwise under the influence of the power spring 9 to open and close the shutter. As in most shutters of this type, the master member 6 carries a latch 33 pivoted to the master member at 34 and having a hook 35 engaging the upstanding pin 36 carried by the blade ring 37 which is pivoted to, and operates the shutter leaves 38 in a known manner.

A switch contact 40 is fixed to the inside of the flange 3 of the casing 1 in any suitable manner and insulated from said casing by the insulating pieces 41. This switch contact is adapted to be engaged by a second contact 42 carried by the arcuate member 16 with a wiping action when the shutter is operated, as will be hereinafter fully described. The contact 40 is made of a resilient metal and formed as shown so that the end 43 thereof, which is the portion actually engaged by the contact 42 to close the lamp circuit, is normally retracted from the path of movement of contact 42 so that the contacts will not engage to close the lamp circuit at the time the shutter is being set. The switch contact 40 may be provided with two depressed portions 44 and 45, the first of which is adapted, when the shutter is in the set position, to lie adjacent the contact 42, the second adjacent the catch number 24, to insure against contact between the same and the contact 40 when the shutter is in a set position, see Fig. 1. The shutter trigger 5 is provided with a turned-down lug 46 covered with an insulation 47 which is adapted to lie adjacent, or in engagement with, the depression 45 in the contact 40 when the parts are in a set position. During the first part of the movement of the trigger 5 to its released position, and prior to the release of the catch member 24 on the setting lever, the end 43 of the contact 40 is adapted to be moved into the path of movement of the contact 42 carried by the arcuate member 16 so that when the setting member is finally released and moves counter-clockwise under the action of the driving spring 18 the contact 42 will be moved into engagement with the contact 40 to complete the lamp circuit.

Referring to Fig. 1, wherein the parts are shown in a set position, and Fig. 2, wherein the parts are shown after the release of the shutter setting member L but prior to its having moved far enough for the pin 14 thereon to disengage the shoulder 13 on the master member to release the same, it will be noticed that the contacts 40 and 42 are arranged relative to one another so that they are adapted to come into engagement to close the lamp circuit a suitable time prior to the release of the master member 6. The relative positions of the contacts should be such that the period between the closing of the lamp circuit and the release of the master member will be such as to account for the "lag" characteristics of the flash lamp in conjunction with the lag found in the shutter, so that the shutter will be fully opened at the peak of illumination of the lamp. The lost-motion connection between the setting member and the master member provided by the particular pin and slot connection disclosed is particularly adapted for providing the desired lapse of time between the closing of the lamp circuit and the release of the shutter. It will be appreciated that the length of the shoulder 13 on the master member 6 can be varied, and the latch for the setting member located accordingly, to provide any desired lapse of time between the release of the setting member and the subsequent release of the shutter thereby.

The switch contacts 40 and 42 may be adapted to be optionally connected to opposite sides of an electrical circuit including a flash lamp in any suitable manner. As one suitable manner of accomplishing this, I have shown the flange 3 of the shutter casing 1 provided with an internally threaded socket 50 extending radially of that portion of the flange covered by the contact 40, and including an internally threaded collar 51 grounded to the flange 3. An electrical plug 52 connected to one end of a conduit 53 is provided with a threaded tip 54 adapted to be screwed into the socket whereupon a shoulder 55 of the plug is grounded to the casing 1 while a prong 56, insulated from the plug, is adapted to extend into the casing and be electrically connected to the contact 40. The conduit 53 carries two wires 57 and 58 constituting opposite sides of an electric circuit including batteries, not shown, which may be contained within a battery case 59, and a socket 60 adapted to receive a flash lamp, but in which I have shown a low voltage test lamp 61. The wire 57 may be grounded directly to the plug 52 whereby it will be grounded to the contact 42 through the shutter casing and metal shutter parts; and wire 58 may be grounded to the prong 56 and ultimately to the contact 40 within the casing. It will be clearly understood how with this arrangement the lamp circuit is normally opened until the contacts 40 and 42 come into engagement, whereupon the circuit is closed to ignite the flash lamp. When the plug 52 is removed from the socket 50 in the shutter casing the shutter can be utilized in the usual manner for daylight pictures because the contacts 40 and 42 are not connected to the shutter operating mechanism in any way so as to restrain the opening and closing movement of the shutter blades and thereby affect the operating speeds of the shutter.

The "lag" characteristics of a lamp which must be accounted for by the synchronizing device will vary with a change in shutter speed so that some means must be provided to adapt the synchronizing device for use at different shutter speeds. For instance, suppose a given lamp has a "lag" of .015 of a second after closure of the lamp circuit and attains its peak of illumination at .020 of a second, the duration of said peak of illumination being fairly sharp and lasting for say .002 of a second. If a shutter speed of 1/500 of a second is to be used, the shutter will be opened only .002 of a second so that its opening must be right at the beginning of the peak of illumination. In order to obtain this result the lost motion connection between the setting member L and the master member 6 must be such that the closing of the lamp circuit will be effected a sufficient time prior to the release of the shutter so as to account for a lag of .020 of a second.

On the other hand if a shutter speed of 1/100 of a second is desired with the same lamp, the "lag" to be accounted for by the lost-motion connection would be shorter than that in a 1/500 of a second shutter speed. This is true because with a 1/100 of a second exposure the shutter remains open .010 of a second and since the duration of the peak of illumination of the lamp is only .002 of a second, in order to have the shutter open during the maximum of the light emitted, the shutter must be opened at say .004 of a second before the lamp reaches its peak of illumination and include the peak and .004 of a second beyond said peak. To accomplish this the shutter must be opened .016 of a second after the lamp circuit is closed, or to account for a .016 of a second "lag" in the lamp, instead of a .020 of a second "lag" as in the case of a 1/500 of a second shutter speed. The difference in timing of the closing of the lamp circuit and the release of the shutter can be accomplished by altering the speed of movement of the setting member L relative to the master member 6 upon release, or by adjusting the relative position of the contacts 40 and 42 with respect to the release time of the master member, whereby the necessary time will elapse between the closing of the lamp circuit and the release of the master member.

I have chosen to show this difference in timing of the closing of the lamp circuit and release of the shutter in accordance with different shutter speeds as affected by changing the speed of movement of the setting member L and the arcuate member 16 connected thereto relative to the master member 6. This change of speed may be effected by providing means whereby the anchor pin 19 for the driving spring 18 can be moved toward or away from the setting member L when the same is in its set position to vary the tension in said spring. As shown in Figs. 5 and 6 the anchor pin 19 may include a shank 62 adapted to extend through the flange 3 of the casing 1. The pin may also include an enlarged shoulder 63 adapted to fit into circular recesses 64 spaced apart along the periphery of the casing 1 to locate the pin relative to the set position of the setting member L. The pin is normally spring pressed into a position with the shoulder 63 engaging one of said recesses by a coil spring 65 surrounding the shank of said pin and held under compression between the inside of the flange 3 and a pin 66 extending laterally through the end of said pin. Several circular recesses 64 are adapted to be connected by a slot 67 wide enough to pass the shank 62 of the pin when said pin is pulled out against the action of the coil spring 65, whereby the position of the pin along the periphery of the casing can be readily changed and consequently the tension of the driving spring 18 can be altered. Inasmuch as the "lag" to be accounted for is greatest when high shutter speeds are used, the least tension in the driving spring 18 will be required at this time so that the pin 19 will be placed in the recess 64 closest the set position of the setting member L. The parts will necessarily be arranged to give the proper relative time of closing of the lamp circuit and release of the shutter in accordance with the desired shutter speed as the anchor pin 19 is adjusted along the periphery of the casing 1, and the several positions of adjustment of said pin may be indexed as to the shutter speeds in accordance with which it adjusts the tension of the driving spring 18.

The operation of this novel synchronizing device will now be outlined. Referring to Fig. 1 the shutter parts are shown in a set position and the anchor pin 19 adjusted to the position adapting the parts to the highest shutter speed, e. g. 1/500 of a second. In this set position of the shutter parts it will be noticed that the end 43 of contact 40 is removed from the path of the contact 42 on the arcuate member 16 and slightly spaced therefrom in the direction of movement of said contact 42, and that the pin 14 on the setting member L is near the extreme end of the shoulder 13 on the master member 6.

When it is desired to make an exposure, the trigger 5 is depressed to release the latch mechanism holding the setting member L, but prior to release of said latch mechanism the trigger moves the end 43 of the contact 40 into the path of movement of the second contact 42. When the setting member L is released, it starts to move counter-clockwise under the action of the driving spring 18 and does not release the master member 6 until the pin 14 thereon leaves the shoulder 13 and comes opposite the slot in the master member whereupon said master member is quickly rotated counter-clockwise by its power spring 9 to operate the shutter. The second contact 42 is adapted to engage the first contact 40 and close the lamp circuit immediately upon the initial movement of the setting member L toward its position of rest, and the circuit is maintained closed during the time the pin 14 is moving over shoulder 13 of the master member 6. When the pin 14 reaches the point shown in Fig. 2 it is just about to release said master member, and the time of movement of the pin up to this point, dependent upon the tension of the spring 18, is adapted to account for the "lag" in the lamp in conjunction with the lag in the shutter to insure the shutter being opened at the time said lamp is at its maximum illumination.

After the master member 6 is released by the setting member L, the same, under the action of spring 9, operates the shutter independently of said setting member so that the wiping engagement of the contact in no way tends to restrain the release movement of the shutter operating mechanism. After release, and prior to a setting of the shutter, the trigger 5 will be released and will return to its inoperative position under the action of spring 25 thereby allowing end 43 of contact 40 to be retracted from the path of said second contact 42. Thus when the shutter is set by moving the setting member L in the direction indicated by the arrow in Fig. 3, the contact 42 can move to the position shown in Fig. 1 without danger of closing the lamp circuit.

From the above description it will be readily appreciated that the present synchronizing device is such as to be essentially a part of the shutter itself thereby giving a neat appearance and a compact arrangement easily adapted to any shutter of the setting type. The switch contacts of the lamp circuit are combined with the shutter mechanism so that the closing of the lamp circuit is dependent upon the release of the shutter, as is recognized to be the best suited arrangement for accurate synchronization; but such contacts are combined with the shutter mechanism in such a way that their engagement does not in any way tend to restrain the movement of the shutter operating mechanism proper, whereby the shutter will operate as well as any other shutter of this type not adapted for synchronization. The lost-motion connection between the shutter setting member and the master member readily adapts the shutter for synchronization in the disclosed manner, and forms the crowning feature of the device in that it provides for the closing of the lamp circuit prior to the release of the shutter operating mechanism, and which interval is necessary to all synchronizing arrangements to account for the "lag" found to be characteristic of all flash lamps. The fact that the movement of the setting member upon release is controlled by its own spring, instead of depending upon the movement of another member operated manually or otherwise, insures that the movement thereof, and the closing of the lamp circuit thereby, will be constant and known after once being adjusted to the desired shutter speed. Further, this particular lost-motion connection and the driving means for the setting member provide an arrangement which can be readily adjusted in accordance with different shutter speeds.

Although I have shown and described certain specific embodiments of my invention, I am fully aware that many modifications thereof are possible. My invention therefore is not to be restricted except in so far as is necessitated by the prior art and by the spirit of the appended claims.

Having thus described my invention what I claim is new and desire to secure by Letters Patent of the United States is:

1. In a photographic shutter having an associated flash synchronizing device the combination of a master member, means for setting and holding the master member in a set position comprising a setting member having a normal position of rest and movable therefrom for setting the shutter, a lost-motion connection between the setting member and the master member permitting said setting member to move idly with respect to said master member after said master member has been set, a releasable latch mechanism for holding said setting member in the shutter setting position, a first contact fixed within said shutter and adapted to be connected to one side of an electrical circuit including a flash lamp, a second contact adapted to be connected to the other side of said circuit, and adapted to move into engagement with said first contact to complete said circuit when said setting member is released from its set position, said second contact operatively connected to said setting member to move therewith when the same is released from its set position, and arranged to engage said first contact prior to the release of said master member by virtue of said lost-motion connection between said setting member and said master member.

2. In a photographic setting type shutter having an associated flash synchronizing device the combination of a master member, means for moving said master member to, and holding it in, a set position, and comprising a setting member normally moved to a position of rest and movable therefrom for setting the master member, a lost-motion connection between the setting member and the master member permitting said setting member to move idly with respect to said master member after said master member has been set but during which movement said master member is adapted to be held in a set position by the setting member, a trigger mechanism for releasably holding said setting member in its set position, a contact adapted to be connected to one side of an electrical circuit including a flash lamp, said contact operatively connected to said setting member to move over a given path in conjunction with a movement of said member, a second contact adapted to be connected to the other side of said circuit and arranged to move to and from an operative position wherein it extends into the path of movement of said first contact to be engaged thereby for completing the circuit through the lamp when the setting member is released, and during the interval said member is moving idly with respect to said master member, means for automatically moving said second contact into its operative position upon release of said setting member, and means for automatically retracting said second contact from its operative position prior to movement of said setting member toward its set position after release of the shutter.

3. In a photographic setting type shutter having an associated flash synchronizing device the combination of a master member, means for moving said master member to, and holding it in, a set position, and comprising a setting member normally moved to a position of rest and movable therefrom for setting the master member, a lost-motion connection between the setting member and the master member permitting said setting member to move idly with respect to said master member after said master member has been set but during which movement said master member is adapted to be held in a set position by the setting member, a trigger mechanism for releasably holding said setting member in its set position, a contact adapted to be connected to one side of an electrical circuit including a flash lamp, said contact operatively connected to said setting member to move over a given path in conjunction with a movement of said member, a second contact adapted to be connected to the other side of said circuit and arranged to move to and from an operative position wherein it extends into the path of movement of said first contact to be engaged thereby for completing the circuit through the lamp when the setting member is released, and during the interval said member is moving idly with respect to said master member, means for automatically moving said second contact into its operative position upon release of said setting member, and means normally moving said second contact from said operative position whereby said contacts will not engage to close said circuit during the setting operation of the shutter.

4. In a photographic setting type shutter having an associated flash synchronizing device the combination of a master member, means for moving said master member to, and holding it in, a set position, and comprising a setting member normally moved to a position of rest and movable therefrom for setting the master member, a lost-motion connection between the setting member and the master member permitting said setting member to move idly with respect to said master member after said master member has been set but during which movement said master member is adapted to be held in a set position by the setting member, a trigger mechanism for releasably holding said setting member in its set position, a contact adapted to be connected to one side of an electrical circuit including a flash lamp, said contact operatively connected to said setting member to move over a given path in conjunction with a movement of said member, a second contact adapted to be connected to the other side of said circuit and arranged to move to and from an operative position wherein it extends into the path of movement of said first contact to be engaged thereby for completing the circuit through the lamp when the setting member is released, and during the interval said member is moving idly with respect to said master member, means normally moving said second contact from said operative position whereby said contacts will not engage during the setting operation of the shutter, and a part of said trigger mechanism adapted to engage and move said second contact into said operative position during its movement for releasing said setting member and prior to the release of said setting member.

5. In a photographic setting type shutter having an associated flash synchronizing device the combination of a master member, means for moving said master member to, and holding it in, a set position, and comprising a setting member normally moved to a position of rest and movable therefrom for setting the master member, a lost-motion connection between the setting member and the master member permitting said setting member to move idly with respect to said master member after said master member has been set but during which movement said master member is adapted to be held in a set position by the setting member, a trigger mechanism for releasably holding said setting member in its set position, a contact adapted to be connected to one side of an electrical circuit including a flash lamp, said contact operatively connected to said setting member to move over a given path in conjunction with a movement of said member, a second contact adapted to be connected to the other side of said circuit and arranged to move to and from an operative position, wherein it extends into the path of movement of said first contact to be engaged thereby for completing the circuit through the lamp when the setting member is released, and during the interval said member is moving idly with respect to said master member, means normally moving said second contact from said operative position whereby said contacts will not engage during the setting operation of the shutter, and an insulated lug associated with said trigger mechanism adapted to engage and move said second contact into its operative position prior to the time the trigger mechanism releases said setting member from its set position.

6. In a photographic setting type shutter having an associated flash synchronizing device the combination of a master member, means for moving said master member to, and holding it in, a set position, said means comprising a setting member normally moved in one direction to a position of rest and movable in the other direction to a set position, a lost-motion connection between said setting member and said master member permitting said setting to move idly with respect to said master member after said master member has been set but during which relative movement said master member is adapted to be held in a set position by said setting member, driving means connected to said setting member and normally acting to move the same to its position of rest, a releasable latch mechanism adapted to engage and hold said setting member in its set position, a trigger for releasing said latch mechanism whereupon said setting member is free to move from its set position under the action of said driving means, a movable contact adapted to be connected to one side of an electrical circuit including a flash lamp, and operatively connected to said setting member to move over a given path in conjunction with said member when the latter is moved, a fixed contact adapted to be connected to the other side of said electrical circuit and adapted to be in the path of movement of said movable contact to be engaged thereby when the setting member moves toward its position of rest, whereby the circuit including said lamp is completed, said contacts arranged relative to one another whereby they are adapted to be separated when said setting member is in its set position, and adapted to be moved into engagement during the time said setting member is moving toward its position of rest and idly relative to said master member prior to the release of said master member.

7. In a photographic setting type shutter having an associated flash synchronizing device the combination of a master member, means for moving said master member to, and holding it in, a set position, said means comprising a setting member normally moved in one direction to a position of rest and movable in the other direction to a set position, a lost-motion connection between said setting member and said master member permitting said setting to move idly with respect to said master member after said master member has been set but during which relative movement said master member is adapted to be held in a set position by said setting member, driving means connected to said setting member and normally acting to move the same to its position of rest, a releasable latch mechanism adapted to engage and hold said setting member in its set position, a trigger for releasing said latch mechanism whereupon said setting member is free to move from its set position under the action of said driving means, a movable contact adapted to be connected to one side of an electrical circuit including a flash lamp, and operatively connected to said setting member to move over a given path in conjunction with said member when the latter is moved, a fixed contact adapted to be connected to the other side of said electrical circuit and adapted to be in the path of movement of said movable contact to be engaged thereby when the setting member moves toward its position of rest whereby the circuit including said lamp is completed, said contacts arranged relative to one another whereby they are adapted to be separated when said setting member is in its set position, and adapted to be moved into engagement during the time said setting member is moving toward its position of rest and idly relative to said master member prior to the release of said master member, and means for varying the speed of movement of said setting member under the action of said driving means whereby the time interval between the closing of said electrical circuit and the release of said master member can be varied in accordance with different shutter speeds for proper synchronization.

8. In a photographic setting type shutter having an associated flash synchronizing device the combination of a master member, means for moving said master member to, and holding it in, a set position, said means comprising a setting member normally moved in one direction to a position of rest and movable in the other direction to a set position, a lost-motion connection between said setting member and said master member permitting said setting member to move idly with respect to said master member after said master member has been set but during which relative movement said master member is adapted to be held in a set position by said setting member, a spring normally acting to move said setting member toward its position of rest, a releasable latch mechanism adapted to engage and hold said setting member in its set position, a trigger for releasing said latch mechanism, a movable contact adapted to be connected to one side of an electrical circuit including a flash lamp, and operatively connected to said setting member to move over a given path in conjunction with said lever when the latter is moved, a fixed contact adapted to be connected to the other side of said circuit and adapted to lie in the path of movement of said movable contact to be engaged thereby when the setting member moves toward its position of rest and at which time said circuit is completed, said contacts arranged relative to one another whereby they are adapted to be separated when said setting member is in its set position, and adapted to be moved into engagement during the time said setting member is moving toward its position of rest and idly relative to said master member prior to the release thereof, and adjustable means for varying the tension in said spring to change the speed of movement of said setting member toward its position of rest and relative to said master member, whereby the interval of time between the closing of said circuit and the release of said master member can be adjusted in accordance with different shutter speeds to give proper synchronization.

9. In a photographic setting type shutter having an associated flash synchronizing device the combination of a master member means for moving said master member to, and holding it in, a set position, said means comprising a setting member normally moved in one direction to a position of rest and movable in the other direction to a set position, a lost-motion connection between said setting member and said master member permitting said setting member to move idly with respect to said master member after said master member has been set but during which relative movement said master member is adapted to be held in a set position by said setting member, a spring normally acting to move said setting member toward its position of rest, a releasable latch mechanism adapted to engage and hold said setting member in its set position, a trigger for releasing said latch mechanism, a movable contact adapted to be connected to one side of an electrical circuit including a flash lamp, and operatively connected to said setting member to move over a given path in conjunction with said member when the latter is moved, a second contact adapted to be connected to the other side of said circuit and adapted to move into and out of the path of movement of said movable contact to be engaged thereby when the setting member moves toward its position of rest and at which time said circuit is completed, said contacts arranged relative to one another whereby they are adapted to be separated when said setting member is in its set position and adapted to be moved into engagement during the time said setting member is moving toward its position of rest and prior to the release of said master member, means normally moving said second contact out of the path of said movable contact, means associated with said trigger adapted to engage and move said second contact into the path of said movable contact prior to the release of said setting member, and means for varying the interval of time between the engagement of said contacts and the release of said master member in accordance with different shutter speeds, whereby the lamp circuit can be closed a suitable time prior to the release of the shutter to insure proper synchronization of the burning of the lamp and the opening of the shutter for any one of several different shutter speeds.

10. In a photographic setting type shutter having an associated flash synchronizing device the combination of a spring actuated master member normally tending to open and close said shutter, a setting member movable between a position of rest and a set position, a lost-motion connection between the setting member and master member comprising a pin and slot, the slot extending between two walls one of which has a shoulder portion, said lost-motion connection permitting said pin to ride out of said slot onto the shoulder, whereby the setting member may move idly with respect to said master member to its set position and the master member may be held against movement by the setting member, a spring normally tending to move said setting member to its position of rest, a releasable latch mechanism for holding said member in a set position, a pivoted trigger for releasing said latch mechanism whereby said setting member is permitted to move toward its position of rest under the action of said spring, a first contact adapted to be connected to one side of an electrical circuit including a flash lamp and carried by said setting member to be moved over a given path thereby when said member moves between its two positions, a second contact adapted to be connected to the other side of said circuit and movable into and out of the path of movement of said first contact, said contacts so arranged relative to one another that when they are in a position for engagement and the setting member is in its set position they will be separated, but will be adapted to move into engagement during the early part of the movement of said member toward its position of rest and prior to the release of the master member thereby, said second contact normally moved from the path of said first contact whereby the circuit is not completed during a setting of the shutter, and an insulated lug carried by said trigger adapted to engage and move said second contact into the path of said first contact when said trigger is pivoted to release said latch mechanism.

11. In a photographic shutter having an associated flash synchronizing device the combination of a shutter blade operating mechanism including a spring normally acting to operate said mechanism, a setting member movable between an inoperative position and a set position, a spring tending to move said setting member to its inoperative position, an operative connection between said setting member and said operating mechanism whereby movement of said setting member toward its set position is adapted to set said operating mechanism and movement from its set position is adapted to release said operating mechanism, said operative connection including a lost-motion arrangement permitting said setting member to move idly with respect to said operating mechanism after the latter is set, and during which movement said setting member is adapted to hold said mechanism in its set position, a releasable latch mechanism adapted to hold said setting member in its set position, a trigger for releasing said latch mechanism, a first stationary contact adapted to be connected to one side of an electrical circuit including a flash lamp, a second contact adapted to be connected to the other side of said circuit and connected to said setting member to move over a given path in conjunction with the movement of said setting member and which path includes said first contact, said contacts arranged relative to one another whereby they are adapted to be separated when the setting member is in a set position, and the second contact is adapted to move into a wiping engagement with said first contact upon the release of said setting member during the time said setting member is moving idly with respect to said operating mechanism and prior to the release of said operating mechanism thereby.

WILLIAM A. RIDDELL.